No. 725,109. PATENTED APR. 14, 1903.
W. MARCUM.
SEEDER AND FERTILIZER DROPPER.
APPLICATION FILED SEPT. 10, 1902.
NO MODEL.
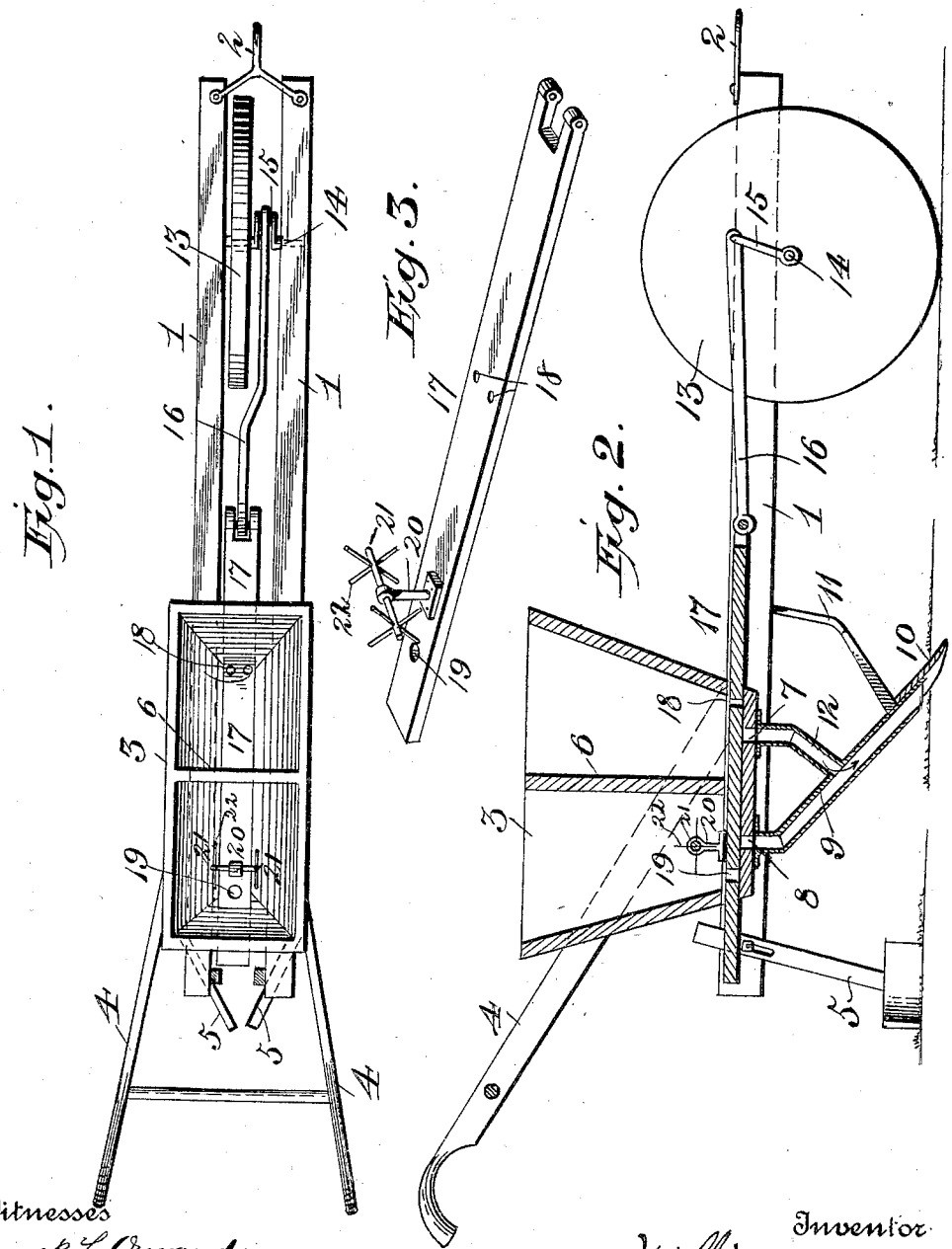

UNITED STATES PATENT OFFICE.

WILLIAM MARCUM, OF TAZEWELL, TENNESSEE.

SEEDER AND FERTILIZER-DROPPER.

SPECIFICATION forming part of Letters Patent No. 725,109, dated April 14, 1903.

Application filed September 10, 1902. Serial No. 122,841. (No model.)

*To all whom it may concern:*

Be it known that I, WILLIAM MARCUM, a citizen of the United States, residing at Tazewell, in the county of Claiborne and State of Tennessee, have invented certain new and useful Improvements in Seeders and Fertilizer-Droppers, of which the following is a specification.

This invention has relation to seeders and fertilizer-droppers; and it consists in the novel construction and arrangements of its parts, as hereinafter described.

The object of the invention is to provide in combination with the seeder a fertilizer-dropper having a revolving stirrer mounted on a reciprocating slide located in the bottom of the hopper, said slide being provided with suitable perforations adapted at intervals to register with openings at the bottom of the hopper attached to said seeder and fertilizer-frame.

In the accompanying drawings, Figure 1 is a top plan view of my invention. Fig. 2 is a longitudinal sectional view of my invention, and Fig. 3 is a perspective view of the slide having the stirrer mounted thereon.

The planter-frame consists of the parallel beams 1 1, having at their forward ends a clevis 2 and a hopper 3, mounted on their rear ends. Suitable handles 4 4 are provided, as are also ordinary cover-boards 5 5. The hopper 3 is provided with a partition 6, which divides it into two compartments, the forward one of which is adapted to contain the seed and the rear one the fertilizer. The bottom of the forward compartment of the hopper 3 is provided with an opening 7, and the bottom of the rear compartment 3 is provided with an opening 8, a tube 9, connecting at its upper end with the opening 8 and being provided at its lower end with a plow-point 10, the brace 11 extending from the beams 1 1 to the lower end of the said tube 9. The tube 12 connects the opening 7 with the said tube 9. The wheel 13 is fixed to the axle 14, which in turn is journaled to the beams 1 1, the said axle being provided with a bell-crank 15, to which is journaled the forward end of the pitman 16. The rear end of the said pitman is pivoted to the slide 17, said slide entering the bottom of both of the compartments of the hopper 3 and having the perforations 18, adapted at intervals to register with the opening 7, and the perforation 19, also adapted at intervals to register with the opening 8. The arm 20 is mounted on the slide 17, and the shaft 21 is journaled in the upper end of said arm 20. The said shaft 21 is provided with the radially-extending fingers 22. The arm 20 and its attachments are located in the rear apartment of the hopper 3.

The operation of the device is as follows: As the planter is drawn over the ground the wheel 13 revolves, as does also the axle 14, and through the bell-crank 15 a reciprocating motion is imparted to the pitman 16, which in turn reciprocates the slide 17. As above described, the perforations 18 and 19 of the said slide at intervals register with the openings 7 and 8, and the seed and fertilizer are permitted to escape from the hopper and pass down the tubes 12 and 9 and fall into the furrow which has been opened by the plow-point 10, the cover-boards 5 filling the earth in the said furrow and covering the seed and fertilizer. As the slide 17 reciprocates it carries with it the arm 20 and its attachments. The shaft 21, journaled to said arm, together with the radially-extending fingers carried by the said shaft, engages the fertilizer and prevents it from clogging in the hopper and loosens it up, so that it will readily pass through the perforation 19 and the opening 8.

Having described my invention, what I claim as new, and desire to secure by Letters Patent, is—

1. In combination with a planter having a hopper, a slide located in said hopper, an arm located on said slide, a shaft journaled at the upper end of said arm and adapted to engage the contents of said hopper and a means for reciprocating said slide.

2. In combination with a planter having a hopper, a slide located in said hopper, an arm mounted on said slide, a horizontal part carried by said arm, radially-extending fingers carried by said horizontal part, a means for reciprocating said slide.

3. In combination with a planter having a hopper, a slide located in said hopper, an arm mounted on said slide, a shaft journaled to said arm, radially-extending fingers attached to said shaft, and a means for reciprocating said slide.

In testimony whereof I affix my signature in presence of two witnesses.

WILLIAM MARCUM.

Witnesses:
J. T. HUGHES,
J. H. CHUMLEY.